Figure 2:
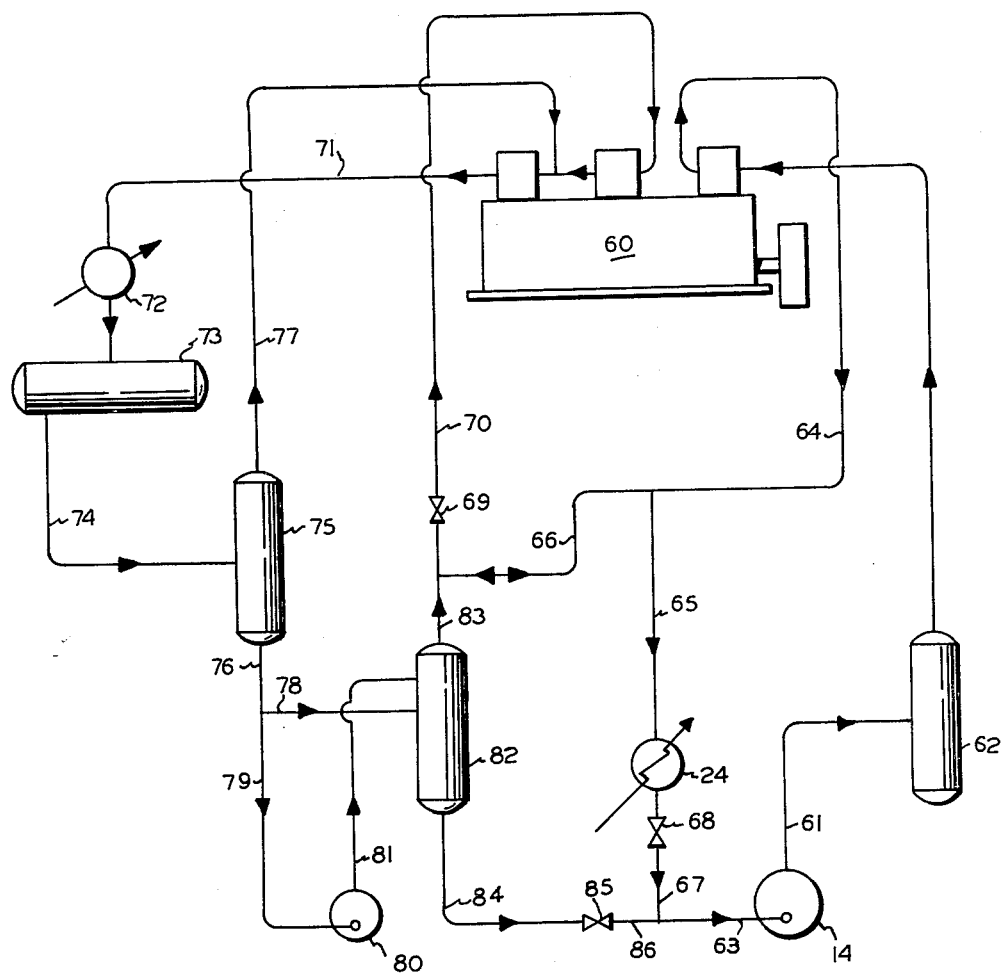

Oct. 26, 1965   L. KNIEL   3,213,631
SEPARATED FROM A GAS MIXTURE ON A REFRIGERATION MEDIUM
Filed Sept. 22, 1961   2 Sheets-Sheet 1
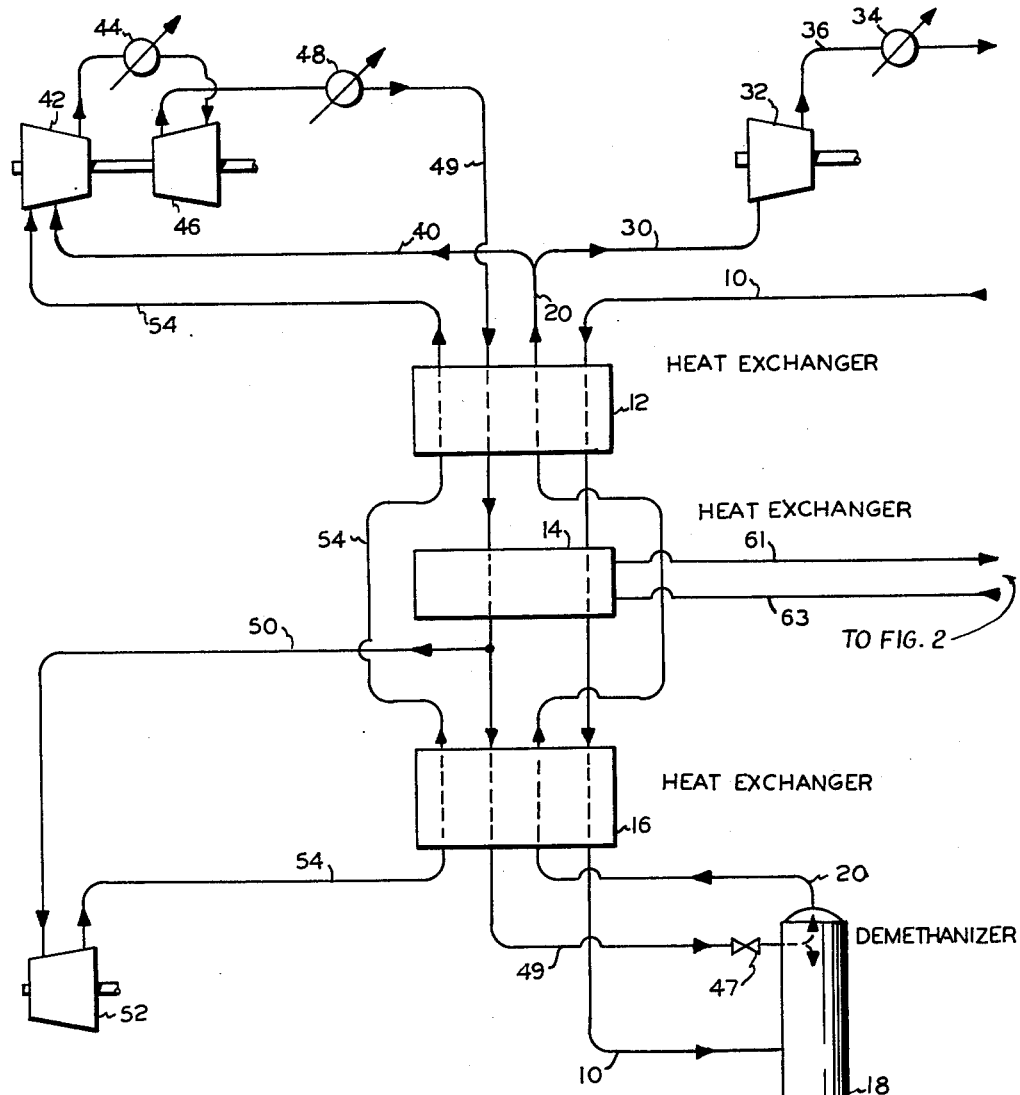
FIG.1
INVENTOR
LUDWIG KNIEL
BY 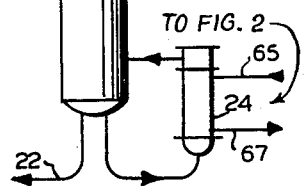
AGENT

United States Patent Office 3,213,631
Patented Oct. 26, 1965

3,213,631
SEPARATED FROM A GAS MIXTURE ON A REFRIGERATION MEDIUM
Ludwig Kniel, Scarsdale, N.Y., assignor to The Lummus Company, New York, N.Y., a corporation of Delaware
Filed Sept. 22, 1961, Ser. No. 140,084
10 Claims. (Cl. 62—11)

This invention relates to a method and apparatus for the separation of the various components of gaseous mixtures and more particularly to a method and apparatus for the efficient and effective separation of normally gaseous hydrocarbon mixtures into a light fraction and a heavy fraction by liquefaction of the heavy hydrocarbon fraction in a recuperative heat exchange and liquefaction system.

It is one of the important features of my invention to separate the components of a gaseous mixture such as natural gas into a lighter fraction separated in gaseous phase and a heavier fraction separated in liquid phase using the lighter gaseous fraction to precool the gaseous mixture to be processed before the mixture reaches the separation stage, and using at least one portion of the lighter gaseous fraction to provide a portion of the cooling requirements of the system.

There are two well known major categories of methods for separating the components of gaseous mixtures, namely absorption and liquefaction. The present invention falls within the liquefaction category and is to be distinguished from the absorption category which includes (1) systems utilizing selective solvents, and (2) lean oil absorption systems, wherein a normally volatile lean oil contacts a gaseous hydrocarbon mixture to be treated under conditions of temperature and pressure whereby a resolution or split of the gaseous mixture into lighter and heavier hydrocarbon fractions is obtained.

Liquefaction systems may be classified according to the method of refrigeration employed to separate the gaseous mixture into a light fraction and a heavy fraction by liquefying the heavy fraction. There are two common methods of producing the necessary refrigeration, namely (I) vaporization of a liquid refrigerant, and (II) use of the Joule-Thompson effect. The present invention is an application of the Joule-Thompson effect.

The vaporization method (I) is a simple process wherein the refrigerant fluid is condensed by compression and cooling. The condensed liquid coolant then flows through a heat exchanger wherein the liquid evaporates substantially at constant pressure as it absorbs heat from the heat exchanger. The vaporized coolant is again compressed and condensed and recycled through the heat exchanger. The most common system utilizing this method is known as a "cascade" system in which two or more coolant fluids are arranged in series so that the one with the lowest boiling point is condensed through the refrigerating effect caused by the evaporation of the one next higher in boiling point, and so on, until the one of highest boiling point is condensed by the atmosphere or by cooling water. One such system used for the liquefaction and separation of air into its constituents has utilized three coolant fluids, ammonia, ethylene and methane.

The liquefaction method (II) utilizes a combined expansion and heat exchange process. Compressed gas at room temperature is cooled and thereafter expanded, whereby it is further cooled and may be partically liquefied. The nonliquefied gas evolved during the expansion of the compressed gas is re-circulated through a heat exchanger to precool the incoming compressed gas.

My invention may be broadly classified as a liquefaction method for separation of gaseous mixtures which may be carried out in a preferred embodiment for separation of compressed natural gas mixtures into an ethane and heavier fraction which is cooled, liquefied and recovered in liquid phase and a methane and lighter fraction which is recovered in gaseous phase.

It is well known that gaseous hydrocarbon mixtures, such as natural gas, are an important source of hydrocarbons such as ethane and, after cracking, of ethylene which are of great importance as starting materials in the synthetic chemical field, e.g. in the production of synthetic alcohols and rubber, certain types of plastics and other products. It is, however, difficult to separate the desired components such as ethane from the undesired components of ethane-containing hydrocarbon gas mixtures such as methane and nitrogen. The separation of ethane from such undesired or contaminant gases requires the use of large and expensive equipment. In the past, absorption and previously known liquefaction methods for separating the ethane from such contaminants have unavoidably entailed the loss of substantial amounts of valuable components and have required a relatively large investment for the plant and the necessary utilities, such as electricity. Furthermore, variations in the composition of the various hydrocarbon gas mixtures have made it extremely expensive to construct a single system of general applicability in ethane recovery from various feeds. Therefore means have been sought to effect substantial economies in plant construction and utilities requirements and make possible inexpensive separation of the ethane and heavier fractions from gaseous hydrocarbon mixtures in sufficient amounts to make wider use worthwhile.

It is a principal object of my invention to provide an efficient and economical process and apparatus for separating normally gaseous mixtures into lighter and heavier fractions by liquefaction of the heavier fraction wherein a portion of the cold requirements are furnished by the lighter fraction.

It is a further object of my invention to provide an efficient and economical liquefaction process and apparatus for separating normally gaseous hydrocarbon mixtures into lighter and heavier hydrocarbon fractions, especially a heavier fraction containing the ethane and heavier components and a lighter fraction containing the methane and lighter components.

Another object of my invention is to provide an improved liquefaction process and apparatus for the separation of gases utilizing a separation tower and having a self-contained refrigeration system used to cool the gaseous feed to the tower and to reboil a portion of the tower bottoms.

A still further object of the present invention is to provide an improved liquefaction process for the separation of gases utilizing a separation tower, wherein the gases evolved as the tower overhead are used to precool the feed to the tower and are further treated for use as reflux in the tower and for additionally precooling the feed to the tower.

Another object of the invention is to achieve an improved liquefaction system of the type set forth above, utilizing at least a portion of the gaseous fraction separated from the gaseous mixture as a refrigerant medium.

The foregoing and other objects and features will become obvious and a fuller understanding of my invention will be gained by referring to the following description and the accompanying drawing illustrating a preferred embodiment of my invention wherein FIGURE 1 is a schematic flow diagram of a preferred embodiment of my invention for separating normally gaseous mixtures into lighter and heavier fractions; and FIGURE 2 is a type of refrigeration system which may be used in the system illustrated in FIGURE 1.

The process in accordance with my invention may be carried out to great advantage using as feed a natural gas mixture having a composition essentially as follows.

| Component: | Volume, percent |
|---|---|
| $N_2$ | 5.18 |
| $CO_2$ | 0.50 |
| $C_1$ | 85.65 |
| $C_2$ | 6.27 |
| $C_3$ | 1.59 |
| $C_4$ | 0.60 |
| $C_5$ | 0.17 |
| $C_6$ | 0.04 |
| | 100.00 |

Water vapor dew point 0° (at 21 p.s.i.a.).

According to my invention, a natural gas mixture feed stream is first freed of carbon dioxide by conventional means (not shown) in a monoethanolamine system to decrease the carbon dioxide content to less than 5 parts per million. By proper design, entrainment of monoethanolamine solution in the effluent gas from the absorber can be minimized. Following the removal of carbon dioxide, the water vapor dew point of the gas is reduced to approximately −22° by conventional means (not shown), for example, by introduction of a 95 mol percent solution of triethylene glycol. The glycol is thereupon removed in a separator, for example, by means of conventional mist extractors (not shown), and withdrawn for reconcentration in a conventional distillation column. The natural gas is next dried, e.g. by dessciant driers of conventional construction (not shown). Any trace of glycol leaving the separator in the gas and residual amounts of carbon dioxide are readliy absorbed in the driers. The gaseous mixture, free of carbon dioxide and water vapor is then introduced as feed in the heat exchange system of the present invention.

Referring now to FIGURE 1 of the drawing, a feed gas mixture as described above is introduced into feed line 10, and is cooled while passing through heat exchangers 12, 14, 16. The cooled feed then enters demethanizer 18 wherein the heavier fraction containing the ethane and heavier components settles in liquid phase as tower bottoms and is removed through line 22 as the ethane product stream. The remaining lighter fraction containing the gaseous methane and lighter components constitutes the tower overhead which leaves the demethanizer 18 via line 20. Demethanizer 18 is of conventional structure and includes a reboiler 24. The liquefied ethane product stream is removed through line 22 and is used, for example, as a feed for an ethane recovery system or a separate system for recovering other components in the stream.

The tower overhead in line 20, which is at the lower temperature than the feed, is used to precool the feed in heat exchangers 16 and 12. The heat exchange system of the present invention is, accordingly, a recuperative heat exchange system wherein a portion of the cooling requirements for liquefying and separating the gaseous feed is recouped from the lighter fraction in precooling the feed.

The gaseous fraction in line 20 passes through heat exchangers 16 and 12 in countercurrent relationship to the feed in line 10 passing therethrough and is heated therein while, at the same time, precooling the gaseous feed. The gaseous fraction in line 20 in leaving heat exchanger 12 divides into a gaseous methane product stream in line 30 and a recycle stream in line 40. The gaseous methane product stream in line 30 passes to compressor 32 and heat exchanger 34 where it is compressed and cooled respectively to be finally discharged from the system via line 36. The methane product stream may be used, for example, as a plant fuel gas stream.

The recycle portion of the gaseous fraction in line 40 is passed to the multiple cycle gas compressors 42 and 46 wherein it is highly compressed to provide a compressed recycle stream. Heat exchangers 44 and 48 are supplied to remove the heat of compression from this stream as it leaves the respective compressors. The compressed recycle gas stream then passes in line 49 through heat exchangers 12, 14 and, after a portion is withdrawn via line 50, the remaining portion is passed through exchanger 16. The entire recycle stream thus is cooled in heat exchangers 12 and 14 and a remaining portion in heat exchanger 16. The remaining portion of the highly compressed gaseous recycle stream leaving heat exchanger 16 in line 49 is passed through expansion valve 47 into the demethanizer 18. This expansion of the cooled, highly compressed, recycle gas stream in line 49 provides the major cooling requirements necessary to liquefy and separate the heavy fraction from the light fraction of the feed stream in demethanizer 18.

The portion of the recycle gas leaving line 49 upstream of heat exchanger 16 via line 50 passes to recycle gas expander 52, wherein the gas is expanded and cooled to provide a relatively low-pressure, highly cooled, recycle stream which passes in line 54 through heat exchanger 16 to provide a portion of the cooling requirements thereof. The cooling stream in line 54 passes through heat exchanger 16 in countercurrent relationship to the gas feed in line 10 and the remaining portion of the recycle gas in line 49. Upon leaving heat exchanger 16, the cooling stream in line 54, after bypassing exchanger 14, passes through the exchanger 12 and multiple compressors 42 and 46 wherein it is compressed and combined with the recycle stream in line 40 to form the highly compressed recycle stream in line 49.

From the above discussion it is seen that heat exchangers 12 and 16 are multiple path, countercurrent flow heat exchangers, wherein the feed gas in line 10 and the recycle gas in 49 are cooled by the gaseous fraction produced in demethanizer 18 and the expanded portion of the recycle gas, passing through lines 20 and 54, respectively. The heat exchangers 12 and 16 provide the major portion of the cooling requirements of the system. However, due to the inherent operating inefficiencies of the compressors, motors, and other apparatus used, additional cooling requirements may have to be filled independently. Accordingly, heat exchanger 14 may be provided as an additional cooling means to cool the feed in line 10 and the recycle gas in line 49. Heat exchanger 14 may be equipped, for example, with a refrigeration system as illustrated in FIGURE 2.

FIGURE 2 illustrates a refrigeration system which may be utilized in the liquefaction system illustrated in FIGURE 1. The preferred coolant for use in the refrigeration system illustrated in FIGURE 2 is propane. The propane system leaves the heat exchanger 14 through line 61 and passes through a surge tank 62 into the first stage of a multi-stage compressor 60. The compressed gas stream leaving the first stage of compressor 60 through line 64 is divided into lines 65 and 66. Line 65 is used as the heating medium for the demethanizer reboiler 24. The propane entering the reboiler 24 will be at a higher temperature than the liquefied fraction leaving the demethanizer 18 as shown in FIGURE 1. Accordingly, the refrigerant in line 65 is cooled in the reboiler 24 while at the same time providing the necessary heat therein. The cooled propane leaving the reboiler is passed through an expansion valve 68 and is passed through line 67 to combine with a further stream described hereinafter forming the feed in line 63 to the heat exchanger 14. Expansion valve 68 in line 67 provides for further cooling in heat exchanger 14.

The compressed gas stream in line 66 passes through valve 69 and line 70 into the final stages of compressor 60, wherein it is compressed. The compressed gas stream leaves compressor 60 via line 71 and is passed through condenser 72 into accumulator 73. The liquid propane is drawn from accumulator 73 through line 74 into a gas-liquid separator 75 wherein propane gas contained in the liquefied propane is removed through line 77 for recycling back to the compressor 60 for recompression. The liquid propane in separator 75 is removed through line 76 which divides into lines 78 and 79. A portion of the liquid propane in line 76 passes directly to a gas-liquid separator 82 through line 78. The portion of liquid propane in line 79 first passes through fractionator condenser 80 and line 81 before entering the gas-liquid separator 82. The gas removed in gas-liquid separator 82 passes through line 83 and joins the compressed propane in line 66 to form the stream in line 70 which passess into the compressor 60 for compression and ultimate condensation in condenser 72.

The liquid propane in separator 82 is removed through line 84 and passed through expansion valve 85 into line 86. The expanded refrigerant in line 86 is combined with the cooled propane stream in line 67 to make up the cooling medium stream for the heat exchange 14 in line 63. The propane refrigeration system, is thus seen to be a self-contained unit inter-connected with the liquefaction system of FIGURE 1 through the heat exchanger 14 and through the demethanizer reboiler 24 to meet a portion of the heat exchange requirements thereof.

Tables I, II, III and IV set forth below various of the operating conditions which may be used in the system when separating a feed mixture having a composition as in the above example with the system operating to produce a methane and lighter fraction and an ethane and heavier fraction in the demethanizer. Table I gives the analysis of the main process streams depicted in FIGURE 1. Tables II and IV are illustrative of the operational requirements, respectively, of the liquefaction system and the propane refrigerant system. Table III indicates the temperature differences across heat exchangers 12, 14 and 16. Utilizing my novel liquefaction system, 90% and more of the ethane may be recovered in the bottoms product stream of the demethanizer.

TABLE I

| Components | Feed prior to $CO_2$ and water vapor removal, exclusive of water vapor | Feed (line 10) | Demethanizer (18) | |
|---|---|---|---|---|
| | | | Off-gas (line 20) | Bottoms (line 22) |
| $N_2$ | 5.18 | 5.21 | 5.70 | |
| $CO_2$ | 0.50 | | | |
| $C_1$ | 85.65 | 86.08 | 93.62 | 5.63 |
| $C_2$ | 6.27 | 6.30 | 0.68 | 66.27 |
| $C_3$ | 1.59 | 1.60 | | 18.72 |
| $C_4$ | 0.60 | 0.60 | | 6.98 |
| $C_5$ | 0.17 | 0.17 | | 1.95 |
| $C_6$ | 0.04 | 0.04 | | 0.45 |
| Total | 100.00 | 100.00 | 100.00 | 100.00 |

TABLE II

*Summary of operating conditions of liquefaction system*

| Designation | Pressure (p.s.i.a.) | Temperature (° F.) |
|---|---|---|
| Feed (line 10) | 306 | +100 |
| Demethanizer (18) | 275 | |
| Feed (line 10) | 300 | −125 |
| Bottoms (line 22) | 275 | +10 |
| Off-gas (line 20) | 270 | −170 |
| Reflux (line 49) | 755 | −125 |
| Compressors (42 and 46): | | |
| Feed (line 40) | 265 | +85 |
| Feed (line 54) | 140 | +85 |
| Exit gas (line 49) | 765 | +100 |
| Cycle Gas Expander (52)— | | |
| Feed (line 50) | 758 | −25 |
| Exit gas (line 54) | 150 | −155 |
| Off Gas compressor (32): | | |
| Feed (line 30) | 265 | +85 |
| Exit gas (line 36) | 440 | +100 |

TABLE III

| | Temperatures (° F.) across the heat exchangers | | | |
|---|---|---|---|---|
| | Line 10 | Line 20 | Line 49 | Line 54 |
| Heat exchanger (12): | | | | |
| Entrance | +100 | −35 | +85 | −35 |
| Exit | −3 | +85 | −3 | +85 |
| Heat exchanger (14): | | | | |
| Entrance | −3 | | −3 | |
| Exit | −25 | | −25 | |
| Heat exchanger (16): | | | | |
| Entrance | −25 | −170 | −25 | −155 |
| Exit | −125 | −35 | −125 | −35 |

TABLE IV

*Summary of operating conditions of propane refrigerant system*

| Designation | Pressure (p.s.i.a.) | Temperature (° F.) |
|---|---|---|
| Heat exchange III (14) | 18 | −35 |
| Demethanizer reboiler (24) | 60 | +25 |
| Accumulator (73) | 210 | +110 |
| Gas-liquid separator (75) | 118 | +71 |
| Gas-liquid separator (82) | 60 | +25 |

I have described my system as applying to the separation of ethane and heavier hydrocarbons from a normally gaseous mixture of the composition illustrated above in the example by liquefaction of the ethane and heavier hydrocarbons. My novel method for improving the efficiency and economics of the liquefaction system is, however, applicable to the separation of any gaseous mixture by a liquefaction process.

While I have shown and described one preferred embodiment of my invention, I am aware that variations may be made thereto, and I, therefore, desire a broad interpretation of my invention within the scope of the disclosure herein and the appended claims.

I claim:

1. A method for the separation of a gaseous mixture into a light fraction and a heavy fraction which comprises: passing said gaseous mixture through a heat exchange zone which includes at least a first and a second stage for cooling the gaseous mixture, separating the gaseous mixture into a light fraction and a heavy fraction at a temperature such that said heavy fraction liquefies, separating the remaining light gaseuos fraction from said liquefied fraction, passing said gaseous fraction in heat exchange relationship with said gaseous mixture through said first and second stages, forming a recycle stream by compressing a portion of said gaseous fraction, cooling said compressed portion by recycling through said first stage in heat exchange relationship with said gaseous fraction, dividing said compressed, cooled portion of said gaseous fraction into a first and a second stream, said first stream being passed through said second stage in heat exchange relationship with said gaseous fraction, and thereafter being expanded in said separating step to provide at least part of the cooling requirement thereof, and said second stream being expanded and thereafter passed through said first and second stages in a path separate from said gaseous fraction and in indirect heat exchange relationship with said gaseous fraction and said gaseous mixture to provide additional cooling for said compressed portion of said gaseous fraction and said gaseous mixture, said second stream being combined and compressed with said recycle stream after passage through said second and first stages, and recovering as products the uncompressed portion of said gaseous fraction and the liquefied fraction.

2. A method for separating a gaseous mixture as in claim 1, wherein said separating step includes a reboiling step, and wherein said heat exchange zone includes a third stage between said first and second stages for reducing the temperature of said gaseous mixture and said compressed portion of said gaseous fraction only, said gaseous fraction and said second stream bypassing said third stage, the cooling requirements of said third stage being supplied by the expansion of a separate compressed gas stream.

3. A method for the separation of a gaseous mixture in claim 2, wherein a portion of said separate compressed gas stream prior to the expansion thereof to supply said third stage cooling requirements is passed through said reboiling step of said separating step to provide the necessary heat requirements thereof and to cool said portion of said separate compressed gas stream.

4. A method for the separation of a gaseous mixture as in claim 3, wherein said compressed portion of said gaseous fraction following said first stage and prior to said second stage is divided into a first and a second stream, said first stream being passed through said second stage in heat exchange relationship with said gaseous fraction, and thereafter being expanded in said separating step, and said second stream being expanded and thereafter passed through said first and second stages in heat exchange relationship with said gaseous mixture to provide additional cooling for said compressed portion of said gaseous fraction and said gaseous mixture, said second stream being combined and compressed with said recycle stream following said second stage.

5. A method for separating a normally gaseous mixture by reducing the temperature of such mixture in a multi-stage heat exchange zone and separating the reduced temperature gaseous mixture into a light gaseous component stream and a heavy component stream which is liquefied by cooling comprising: reducing the temperature of the gaseous mixture in a multi-stage heat exchange zone by passing said gaseous mixture and said gaseous component of said separating step in heat exchange relationship through at least a first and a second stage thereof, withdrawing as product a portion of said gaseous component, compressing the remaining portion of said gaseous component following said stages, recycling said compressed gaseous component through said first stage in heat exchange relationship with said gaseous component, dividing said compressed gaseous component into a first and a second stream, passing said first stream through said second stage in heat exchange relationship with said gaseous component, and thereafter expanding said first stream in said separation zone to provide at least a part of the cooling requirements for the liquefaction of said heavy component, separately expanding said second stream to cool the same, and thereafter separately passing said expanded second stream through said second and first stages in indirect heat exchange relationship with said gaseous mixture and said gaseous components of said separating step to provide a portion of the cooling requirements of said stages, and thereafter combining and compressing said second stream with said remaining portion of said gaseous component following said first stage.

6. A method for separating a normally gaseous mixture as in claim 5, including passing said compressed gaseous component and said gaseous mixture only through a third stage of said heat exchange zone placed between said first and second stages, said gaseous component stream and said expanded second stream bypassing said third stage, said third stage being cooled by the expansion of a separate compressed gas stream.

7. A method for the separation of a normally gaseous mixture as in claim 6, wherein said separating step includes a reboiling step, and wherein a portion of said separate compressed gas stream prior to the expansion thereof to cool said third stage is passed through said reboiling step of said separating step to provide the necessary heat in said reboiling step and to cool said portion of said separate compressed gas stream.

8. A method for the separation of a natural gas mixture substantially into a methane and lighter fraction and an ethane and heavier fraction comprising: passing said natural gas mixture through a multi-stage heat exchange zone including a first stage, a second stage and a third stage between said first and second stages to cool the gaseous mixture to a relatively low temperature, separating the natural gas mixture into substantially a methane and lighter fraction and an ethane and heavier fraction by further cooling said reduced temperature natural gas mixture to a temperature such that said ethane and heavier fraction liquefies said separating step including a reboiling step, removing said methane and lighter fraction as a gaseous fraction from said liquified ethane and heavier fraction, passing said gaseous fraction in heat exchange relationship with said natural gas mixture through said first and second stages, withdrawing as product a portion of said gaseous fraction compressing the remaining portion of said gaseous fraction, cooling said compressed portion of said gaseous fraction by recycling said compressed portion through said first and third stages, separating said compressed portion into a first and a second stream, passing said first stream through said second stage and thereafter expanding said first stream in said separating step to provide at least a portion of the cooling requirements thereof, passing said second stream to a separate expansion step, expanding said second stream in said expansion step and cooling said stream, and thereafter passing said expanded and cooled second stream through said first and second stages in heat exchange relationship with said natural gas mixture and compressed recycle portion to provide portion of the cooling requirements of said first and second stages, thereafter combining and compressing said second stream with said remaining portion of said gaseous fraction, recovering as product the liquefied fraction the cooling requirements of said third stage being supplied by the expansion of a separate propane refrigerant, a portion of said separate propane refrigerant prior to the expansion thereof to cool said third stage being passed through said reboiling step of said separating step to provide the necessary heat in said reboiling step and to cool said portion of said separate refrigerant stream.

9. Apparatus for separating a normally gaseous mixture into a light fraction and a heavy fraction which includes:

heat exchange means for precooling said gaseous mixture, and including a first heat exchanger, a second heat exchanger and a third heat exchanger between said first and second exchangers;

separating means for liquefaction of the heavier fraction of said gaseous mixture and including means for recovery of a liquid fraction and a gaseous fraction;

means for passing said gaseous fraction through said first and second heat exchangers in heat exchange relationship with said gaseous mixture;

means for recovering as product a portion of said gaseous fraction;

means for compressing the remaining portion of said gaseous fraction;

means for recycling the compressed remaining portion through said first and third heat exchangers for cooling therein;

means for dividing said remaining portion into first said second streams;

means for passing said first stream through said second heat exchanger and expanding said first stream in said separating means to provide at least a part of the cooling requirements thereof;

means for separately expanding said second stream;

means for passing said expanded second stream through said second and first heat exchangers in a path separate from said gaseous fraction and in indirect heat exchange relation with said gaseous mixture, said first stream, said gaseous fraction and said compressed remaining portion, and back to said compressor means; and separate refrigeration means for said third heat exchanger, said means including means for expanding a refrigerant to provide the necessary cooling for said third heat exchanger and means for condensing the expanded refrigerant.

10. Apparatus for separating normally gaseous mixtures as defined in claim 9, wherein said separating means includes a separation tower and a reboiler therefor, and wherein said condensing means for the refrigerant includes means for providing the heat requirements of said reboiler.

References Cited by the Examiner

UNITED STATES PATENTS

| | | | |
|---|---|---|---|
| 2,134,702 | 11/38 | Brewster | 62—40 X |
| 2,214,790 | 9/40 | Greenewalt | 62—39 X |
| 2,526,996 | 10/50 | Crawford | 62—30 X |
| 2,627,731 | 2/53 | Benedict | 62—30 X |
| 2,696,088 | 12/54 | Twomey | 62—40 X |
| 2,760,356 | 8/56 | Sixsmith. | |
| 2,932,173 | 4/60 | Mordhorst | 62—40 X |
| 2,937,076 | 5/60 | Class. | |
| 2,982,108 | 5/61 | Grunberg et al. | 62—31 X |
| 3,037,359 | 6/62 | Knapp | 62—23 X |
| 3,098,732 | 7/63 | Dennis | 62—40 X |
| 3,118,751 | 1/64 | Seidel | 62—40 X |

NORMAN YUDKOFF, *Primary Examiner.*

EDWARD MICHAEL, *Examiner.*